A. VASSELLI.
FASTENING DEVICE.
APPLICATION FILED JAN. 17, 1918.
1,276,456.
Patented Aug. 20, 1918.
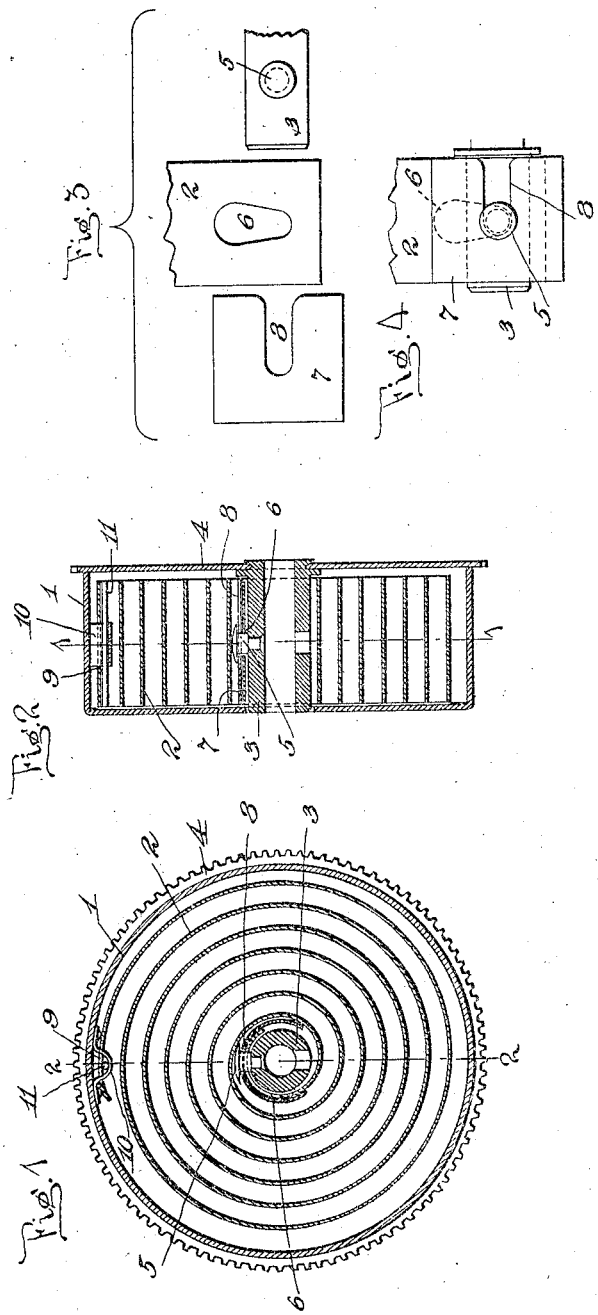
Inventor
Anthony Vasselli
by Schechter Lotsch
his Attorneys

UNITED STATES PATENT OFFICE.

ANTHONY VASSELLI, OF NEWARK, NEW JERSEY, ASSIGNOR TO OTTO HEINEMAN PHONOGRAPH SUPPLY CO., INC., A CORPORATION OF NEW YORK.

FASTENING DEVICE.

1,276,456.  Specification of Letters Patent.  Patented Aug. 20, 1918.

Application filed January 17, 1918. Serial No. 212,237.

*To all whom it may concern:*

Be it known that I, ANTHONY VASSELLI, a citizen of the United States, and a resident of the city of Newark, county of Essex, and State of New Jersey, have invented a certain new and useful Fastening Device, of which the following is a specification.

My invention relates to means for securing the inner ends of springs to mandrels, and more particularly to securing and retaining the helical springs on the mandrel, sleeve, collar, or shaft of talking machine motors.

The invention contemplates the provision of means for supporting and retaining the helical spring on the shaft or other suitable means, and to effectively prevent the spring from becoming released from the shaft, or other means.

A further object of my invention is to provide means by which the end of a helical spring may be secured to its mandrel in such a manner that it will be held against movement in any direction.

A further object of the invention is to provide a fastening device of the character described, which is extremely simple in construction, thoroughly reliable and efficient securing means, inexpensive to manufacture, and which may be attached to mechanisms now employed without the use of special tools.

With these and other objects in view, to be more fully set forth hereinafter, the invention consists in the novel construction, combination of elements, and arrangement of parts which will be exemplified in the construction hereinafter described in the specification and illustrated in the accompanying drawings considered together or separately.

In securing a spring to a mandrel or shaft, it is the present practice to secure a headed stud to the mandrel or shaft, and provide the spring near its inner end with a key hole usually of pear shape. The large end of the keyhole is of such a size that the head of the stud will pass through it, and the smaller end of the hole is of such size that it will fit around the shank of the stud, but will not permit the head of the stud to pass through it.

It frequently happens in practice that when the spring is entirely unwound, the inner end thereof will creep around the mandrel until the large end of the keyhole comes under the head of the stud. A jar may now cause the end of the spring to be released from the stud and when this occurs, the motor is useless and will not operate, and it must be sent to a machine or repair shop to have the spring reset.

By my invention, the spring is prevented from leaving the stud no matter what the position of the stud is relatively to the slot.

I have illustrated my invention in the accompanying drawings, in which like parts in all of the several figures are designated by similar reference characters, and in which:—

Figure 1 is a transverse section of a spring barrel carrying a single spring, the section being taken on the line 1—1 of Fig. 2;

Fig. 2 is a section on the line 2—2 of Fig. 1;

Fig. 3 is a detail plan view of the parts in separated condition; and

Fig. 4 is a similar view showing the parts in position.

In carrying out my invention, I provide a cup-shaped spring barrel 1 of any well known type. Within the barrel is a helical spring 2, one end of which is secured to the barrel, and the other end of which is secured to a sleeve 3 which in this case forms a mandrel. The sleeve 3 is hollow for the passage of a supporting or winding shaft (not shown). The sleeve can be made solid if desired.

Carried on one end of the mandrel is a disk 4, the periphery of which is provided with spur teeth whereby the power of the spring may be utilized. The disk 4 forms one side of the barrel and the spring is entirely inclosed.

A headed stud 5 is riveted in position on the mandrel. The inner end of the spring 2 is provided with an opening 6 which may be either pear-shaped, one end being of a size sufficient to pass over the head of the stud, and one end of a size to engage the shank under the head, as is common, or it may be of a size sufficient to pass over the head of the stud at any point.

I provide a keeper 7 preferably of sheet metal bent into a cylindrical form and having a longitudinal slot 8, said slot being provided with rounded corners at one end, which merge into the surface, forming one edge of the keeper. The slot 8 is of sufficient width to receive the shank of the stud, and pass under the head of the stud, but not wide enough to pass over the head of the stud, thereby effectively securing and retaining the helical spring on the mandrel, and preventing the same from becoming released from its fastening on the mandrel. The length of the keeper is approximately equal to the width of the spring which is substantially equal to the depth of the spring barrel, thus always retaining the stud in its proper position, and making it impossible for the spring to become unfastened.

The outer end of the spring is provided with an opening 9 which fits over a staple 10 riveted or otherwise secured to the barrel, and a pin 11 having a length substantially equal to the width of the spring barrel is inserted between the bow of the staple and the spring. The length of the pin is such that it cannot be dislodged from its position, and the end of the spring will be securely and removably secured to the barrel.

In assembling the parts of the device, the inner end of the spring is laid around the mandrel and the wide portion of the opening 6 is moved down over the head of the stud. The spring is then moved around the mandrel until the narrow portion of the opening is under the head of the stud.

The keeper is now inserted over the inner convolution of the spring which contains the opening 6, and between it and the head of the stud, the slot 8 in the keeper permitting this to be done. The keeper is moved inward until its outer edge is flush with the edge of the spring. Its inner end will now be in proximity to the toothed disk or some other member secured thereto.

The outer end of the spring is now secured to the inner circumferential wall of the barrel. The end of the mandrel now projects into or through an opening in the barrel, and the spring is ready for use.

Instead of the opening 6 being elongated, as shown, it may be circular or any other shape, the only requirement necessary being that it must be of a size sufficient to permit the passage of the head of the stud.

I desire to have it understood that the keeper 7 may be of a form other than that illustrated.

I have illustrated my invention in connection with a barrel containing a single spring, but I desire to have it understood that the same may be carried out in a multiple spring barrel, the partitions between the springs preventing movement of the keeper 7 and pin 11.

I have illustrated and described my improved fastening device as applied to a spring motor for talking machines. I wish it understood that I do not so limit my invention, and that my improved fastening may be put to other uses.

In accordance with the provisions of the patent statute, I have described the principle of my invention together with the apparatus which I now consider to represent the best embodiment thereof, but I desire it understood that my invention is not confined to the particular form of apparatus herein shown and described, and, therefore, I claim broadly the right to employ all equivalent instrumentalities coming within the scope of the appended claims, and by means of which objects of my invention are attained, and the new results accomplished, as herein set forth, as it is obvious that the particular embodiment herein shown and described is only one of many that can be employed to attain these objects and accomplish these results.

I have illustrated my invention in connection with a spring barrel having a sleeve 3 surrounding a supporting or winding shaft, but I desire to have it understood that this sleeve can be dispensed with and that the supporting or winding shaft can have directly fastened to it the stud member 5.

Having now described my invention, what I claim and desire to secure by Letters Patent is:—

1. A device of the character described, comprising a mandrel, a stud carried by the mandrel, a head on the stud, a member having an opening therein, said opening engaging the stud, and a keeper between the member and the head of the stud.

2. A device of the character described, comprising a mandrel, a stud carried by the mandrel, a head on the stud, a spring encircling the mandrel, there being an opening in the spring, said stud engaging the opening, said opening being of a size sufficient to permit the passage of the head of the stud, a keeper engaging the stud between the head and the spring, and means for preventing movement of the keeper relatively to the mandrel.

3. A device of the character described, comprising a mandrel, a stud carried by the mandrel, a head on the stud, a spring encircling the mandrel, there being an opening in the spring, said stud engaging the opening, said opening being of a size sufficient to permit the passage of the head of the stud, a U-shaped keeper engaging the stud between the head and the spring, and means for preventing movement of the keeper relatively to the mandrel.

4. A device of the character described, comprising a spring barrel having a head, a mandrel, a member carried by the mandrel and forming a second head for the barrel, a spring having one end secured to the barrel, a headed stud carried by the mandrel, one end of the spring having an elongated opening engaging the stud below the head thereof, a keeper engaging the stud between the head thereof and the spring, said keeper having an open ended slot therein, said slot being of less length than the keeper, the slot in the keeper being arranged at right angles to the opening in the spring, the length of the keeper being so proportioned relatively to the depth of the barrel as to prevent movement of the keeper longitudinally of the mandrel.

5. A device of the character described, comprising means having a projection on its surface, a member having an opening therein for engaging said projection, and means between the said member and the projection for effectively retaining said member in position.

6. In a device of the character described, the combination with a mandrel having a projection thereon, a spring provided with an opening for engagement with said projection, a keeper engaging said projection, and means for preventing movement of the keeper relatively to the mandrel.

7. In a spring motor, a drum carried by a sleeve, a stud on the sleeve, a coil spring connecting said drum and sleeve, said spring having an opening adapted to engage the stud, and means engaging said stud and spring to effectively retain said members in position, and prevent the spring from becoming disengaged from the stud.

8. In a spring motor, a drum carried by a sleeve, a stud on the sleeve, a coil spring connecting said drum and sleeve, said spring having an opening adapted to engage the stud, means engaging said stud and spring to effectively retain said members in position and prevent the spring from becoming disengaged from the stud, a member secured to the inner surface of the drum adapted to engage an opening in the spring, and means engaging said member and spring to effectively retain the same and prevent the spring from becoming disengaged from the drum.

9. A device of the character described, comprising a member provided with a stud, a spring having an opening therein, said opening engaging the stud, and a keeper between the spring and the member, the keeper engaging said stud.

10. A device of the character described, comprising a member provided with a stud, a spring having an opening therein, said opening engaging the stud, a keeper between the spring and the member, said keeper engaging said stud, a staple fastened to the inner surface of a drum, adapted to engage an opening in the spring, and a pin between the spring and the staple.

11. A device of the character described, comprising a member provided with a stud, a spring having an opening therein, said opening engaging the stud, and a keeper between the spring and the member, there being a slot in the keeper for engagement with the stud.

12. A device of the character described, comprising a member provided with a stud, a spring having an opening therein, said opening engaging the stud, and a keeper between said spring and the member, the keeper engaging said stud, the length of the keeper being approximately equal to the width of the spring.

13. A device of the character described, comprising a member provided with a stud, a spring having an opening therein, said opening engaging the stud, and a keeper between the spring and the member, said keeper being provided with a slot for engagement with the stud, the length of the keeper being approximately equal to the width of the spring, the slot being of shorter length than the keeper.

This specification signed and witnessed this 4th day of January, 1918.

ANTHONY VASSELLI.

Witnesses:
ELIZABETH M. BALLING.
NORMAN E. ZUSI.